US012502786B2

(12) United States Patent
Jacobus et al.

(10) Patent No.: US 12,502,786 B2
(45) Date of Patent: Dec. 23, 2025

(54) ROBOTIC SYSTEM FOR DEMILITERIZING MUNITIONS

(71) Applicant: Cybernet Systems Corp., Ann Arbor, MI (US)

(72) Inventors: Charles J. Jacobus, Brighton, MI (US); Glenn J. Beach, Grass Lake, MI (US); James Burkowski, South Lyon, MI (US); Joseph Long, Ypsilanti, MI (US); Gary Moody, Dexter, MI (US); Gary Siebert, Ann Arbor, MI (US)

(73) Assignee: Cybernet Systems Corp., Ann Arbor, MI (US)

( * ) Notice: Subject to any disclaimer, the term of this patent is extended or adjusted under 35 U.S.C. 154(b) by 1685 days.

(21) Appl. No.: 16/244,423

(22) Filed: Jan. 10, 2019

(65) Prior Publication Data

US 2020/0223068 A1 Jul. 16, 2020

(51) Int. Cl.
*B25J 9/16* (2006.01)

(52) U.S. Cl.
CPC ........... *B25J 9/1697* (2013.01); *B25J 9/1617* (2013.01); *B25J 9/1682* (2013.01)

(58) Field of Classification Search
CPC .... B25J 11/0025; B25J 9/1697; B25J 9/1617; B25J 9/1682; B44D 3/16
See application file for complete search history.

(56) References Cited

U.S. PATENT DOCUMENTS

| | | | | |
|---|---|---|---|---|
| 5,038,038 A | * | 8/1991 | Weniger | G01G 9/005 250/341.8 |
| 5,789,695 A | * | 8/1998 | Scherer | F42B 33/06 86/49 |
| 8,988,273 B2 | * | 3/2015 | Marianer | G01S 7/41 342/188 |
| 9,815,175 B2 | * | 11/2017 | Miller | B24C 11/005 |
| 2013/0120547 A1 | * | 5/2013 | Linnell | H04N 13/363 348/61 |
| 2014/0046613 A1 | * | 2/2014 | Roberts, Jr. | G01R 31/2893 702/108 |

(Continued)

FOREIGN PATENT DOCUMENTS

| | | | | |
|---|---|---|---|---|
| CN | 101984750 | * | 3/2011 | ............. B25J 19/06 |
| CN | 101984750 A | * | 3/2011 | ............. B25J 19/06 |

(Continued)

*Primary Examiner* — Wade Miles
*Assistant Examiner* — Aaron G Cain
(74) *Attorney, Agent, or Firm* — Fishman Stewart PLLC

(57) ABSTRACT

In an automated system and method uses a multi-axis robot arm and computer vision system to perform critical demil processes using a plurality of networked workcells monitored and managed by a central processor. An inspection and paint removal cell strips paint or other coatings from the outer surface of the ordnance for disposal of the paint or other coatings. A defusing cell is operative to remove a fuse from the ordinance for disposal of the fuse, and a cutting and definning cell operative to remove fins from the body of the ordnance, and cut into the body of the ordnance to determine if submunitions are present in the ordnance. A multi-axis robot arm and computer vision system removes submunitions from the ordnance, if present, inspecting the submunitions, and transferring the submunitions to the cutting and definning cell for subsequent processing.

15 Claims, 4 Drawing Sheets

(56) References Cited

U.S. PATENT DOCUMENTS

2016/0149996 A1* 5/2016 Eckert ................ G05B 23/0264
                                                            709/217
2018/0112958 A1* 4/2018 Willenbring ............ F42B 10/14

FOREIGN PATENT DOCUMENTS

| CN | 109098408 A | * | 12/2018 | .............. E04F 21/08 |
| DE | 3913479 C1 | * | 8/1990 | ............... B09B 3/00 |

* cited by examiner

Submunitions Palletizing for Burn-out

ROBOTIC SYSTEM FOR DEMILITERIZING MUNITIONS

FIELD OF THE INVENTION

This invention relates generally to munitions and, more particularly, to a system and method for opening and disassembling ordnance especially cluster munitions, for demilitarization employing robotics technology.

BACKGROUND OF THE INVENTION

Many forms of ordnance have become obsolete. Since ordnance incorporates forms of high explosives, perpetual storage as a solution for old munitions became necessary for safety reasons, but this approach incurs indefinite space and costs. One alternative is demilitarization (or "demil"), which either involves detonation, or disassembly of the munitions into their constituent parts. If disassembled, the parts can either be destroyed (often by burning out high energy components) or reclaimed as scrap material.

The prior art includes patents disclosing parts of the demil process; for example, cutting apart munitions: U.S. Pat. Nos. 10,077,966, 10,076,821, 9,815,175, 9,744,645, 9,744,643, 9,446,500, 7,328,643; destruction by explosives: U.S. Pat. Nos. 8,695,263, 6,196,107 and US application 2017/0284781; the use of high-energy neutrons: U.S. Pat. No. 8,675,802; or techniques involving draining gasses or liquids (which might be high explosives or toxic gasses: U.S. Pat. No. 5,657,676.

However, while prior-art techniques address portions of the demil process, they either leave out aspects of the entire process, take too much time, and/or put human personnel at risk. There is an outstanding need, therefore for a system and process for unmanned demilitarization of ordnance, and especially more complex cluster ordnance and bombs.

SUMMARY OF THE INVENTION

This invention resides in an automated system and method for demilitarizing munitions. In contrast to existing configurations, the preferred embodiments use a multi-axis robot arm and computer vision system to perform critical demil processes using a plurality of networked workcells monitored and managed by a central processor.

Each workcell is operative to receive ordnance for sequential demilitarization processes. Initially, an inspection and paint removal cell is used to determine if the ordnance requires outer surface stripping and, if so determined upon inspection, the inspection cell and paint removal cell strips paint or other coatings from the outer surface of the ordnance for disposal of the paint or other coatings.

A defusing cell is operative to remove a fuse from the ordinance for disposal of the fuse, and a cutting and definning cell operative to remove fins from the body of the ordnance, and cut into the body of the ordnance to determine if submunitions are present in the ordnance.

In the preferred embodiments, a multi-axis robot arm and computer vision system is operative to perform demilitarization processes without manual intervention, at least including the steps of removing submunitions from the ordnance, if present, inspecting the submunitions, and transferring the submunitions to the cutting and definning cell for subsequent processing.

The multi-axis robot arm and computer vision system is preferably operative to examine a visual indicator on the ordinance to determine if the fuse is armed. If armed, the multi-axis robot arm is operative to remove the fuse if determined to be unarmed by the computer vision system.

The central controller implements safety interlocks such as laser light curtains, and checks to prevent personnel from entering a workcell cell when it is operating. The central controller also flags the detection of an armed munition or submunitions and terminates the automation pending manual analysis.

DETAILED DESCRIPTION OF THE PREFERRED EMBODIMENTS

Figure 1:
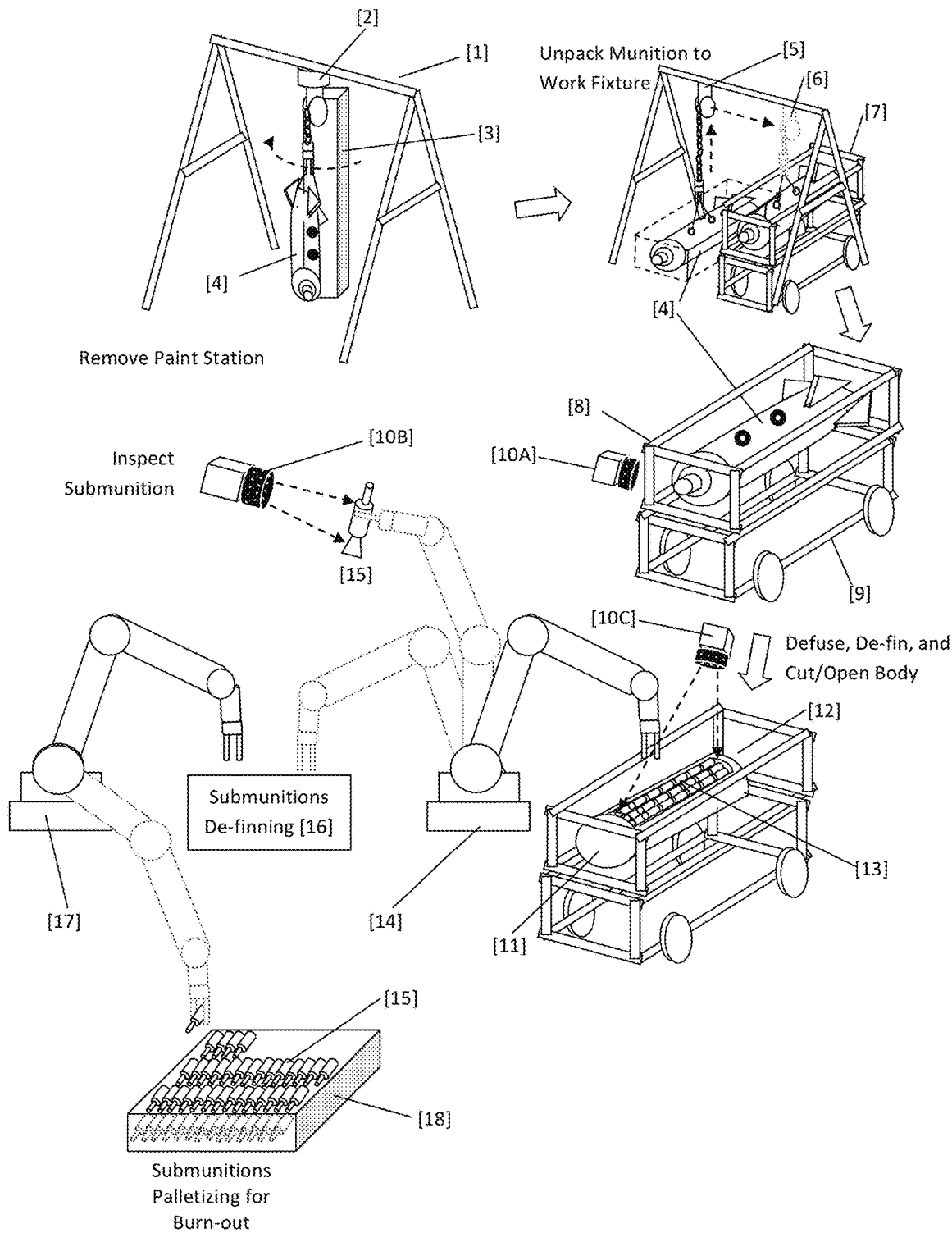
FIG. 1 illustrates a robotic work cell configured in accordance with the invention.

Now making reference to the accompanying drawings, FIG. 1 illustrates a robotic work cell configured in accordance with the invention. Though optional in some cases, the system may employ a water jet to remove any external coating over the bomb or shell body. If such a covering has a toxic component, this is removed to safely further disassemble the munition [1]-[4]. The waste water from surface (paint) removal is treated to remove toxic particulate and chemicals using appropriate approved chemical processing and filtration techniques.

The de-painted munition is loaded into the process fixtures [4]-[9]. The ordnance fuse is removed [11], usually after inspection to assure that the fuse is in the disarmed state (for instance, an indicator port shows a green dot to a machine vision detection system for a disarmed fuse, whereas a red dot for an armed fuse [10A]. Although manual removal must be performed in some cases, fuse removal is preferably performed by a robotic asset gripping the ordnance nose, and twisting off the fuse. Alternative detachments may include latches that have to be unlocked, covers that must be removed prior to further fuse detachment, or screw/bolt circles where each screw or bolt must be removed to make the fuse body removable. Usually the removed fuse is sent to a burn-out station and the inert burnt-out fuse (which is an inert metal case at that point) may be sent out for metal scrap.

Defusing stops for manual bomb disposal if the fuse has been detected as armed [10A or B]. In this case, a more detailed review might be required prior to fuse removal by bomb disposal personnel. For simple High Explosive (HE) rounds, it may be possible to remove (through heating and liquefying or by pouring out powered HE) the explosive for reclamation. Or, alternatively, the ordnance body may be placed into a burn-out station to oxidize the HE to inert gases ($CO_2$ and water vapor). However, in the more complex case of cluster munitions, further disassembly will be required.

For cluster munitions (or arrayed munitions), it is typically necessary to download each submunition and perform individual demilitarization. To accomplish this, it is necessary to access the submunitions, which is most conveniently accomplished by removing munition nose and/or tail assemblies through cutting [11]-[12]. For some munitions, however, it may be possible to remove either or both the nose or tail by disassembling a screw/bolt circle that attaches the nose and/or tail to the munition body. Then, submunitions can either be pulled out of the munition body or accessed by cutting the munition body into component parts, exposing the submunitions from the top [13].

Once access to the submunitions is achieved, downloading each submunition through computer-vision-guided robotic pick-and-place to a submunition disassembly stage is performed [14]. This process acquires the next submunition location, directs the robot to grip the submunition at that location, removes it from the munition body, inspects the submunition to determine if it is disarmed (again this might be by computer vision recognition of an arm/disarm dot that is green if disarmed and red if armed), and places the disarmed submunition into the disassembly station [16].

Figure 4:
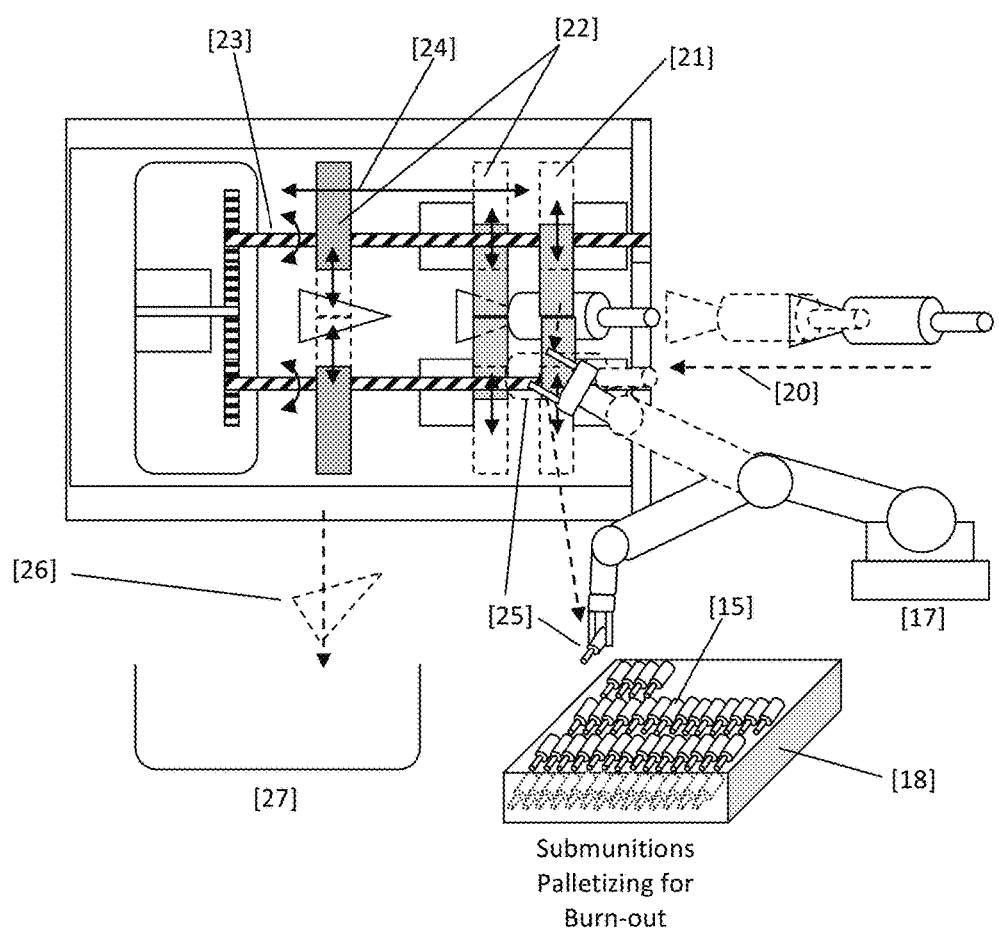
FIG. 4 illustrates a de-finning process.

In accordance with the disassembly embodiment shown in FIG. 4, a robot inserts the submunition [20] into a de-finning machine, wherein clamps [21] retain the submunition body and [22] the submunition fins. The fins [24] may then be pulled from the submuntion body (actuated by a motor, gear train, and ball screw mechanism [23]), depositing them [26] into a disposal tub [27]. The submuniton body is then re-located and pick-up [25] by a second vision guided robot that proceeds to place de-finned submunition body [15] into a crate [18] for transit to the submunitions burn-out facility. Upon submunitions burn-out, the submunitions bodies become metal scrap. The empty munition body also becomes metal scrap when all submunitons are downloaded.

Figure 2:
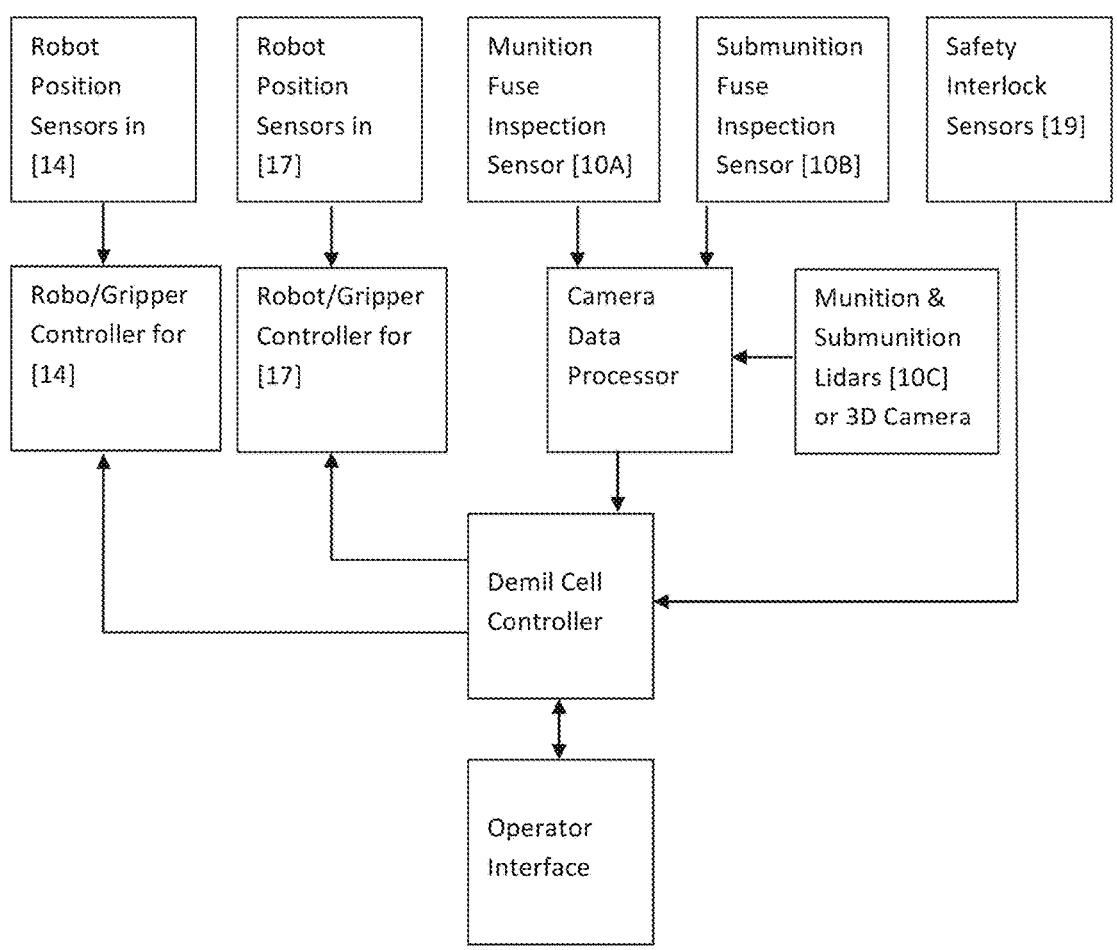
FIG. 2 is a block diagram that depicts robotic work cell controls and sensors.

Referring now to FIG. 2, the robotic work cell is monitored and operated through a set of sensors including the sensors used to monitor and control the position of the two submunitions manipulating robots and their grippers, computer vision systems including lidar and cameras [10A-C] and video processor(s) for localizing submunitions, the munition body, and disarm indicators in both the munition fuse and the submunitions, and robotic safety sensors (which may include light curtains, limit switches on access gates, collision detection sensors, etc.). These feed into the overall robotic demil automation cell controls (Demil Cell Controller), which also provide the cell operator with a control interface that includes stop, start, pause, and restart automation functions that indicate the operating status of the work cell system. This controller implements all safety interlocks and checks to prevent the operator or other people from entering the cell when it is operating and is unsafe. It also flags detection of an armed munition or submunitions, stops the automation until explosive ordinance disposal experts can examine the armed components and determine the best way to manual disarm and/or remove them, after which the automation cell can be restarted.

Figure 3:
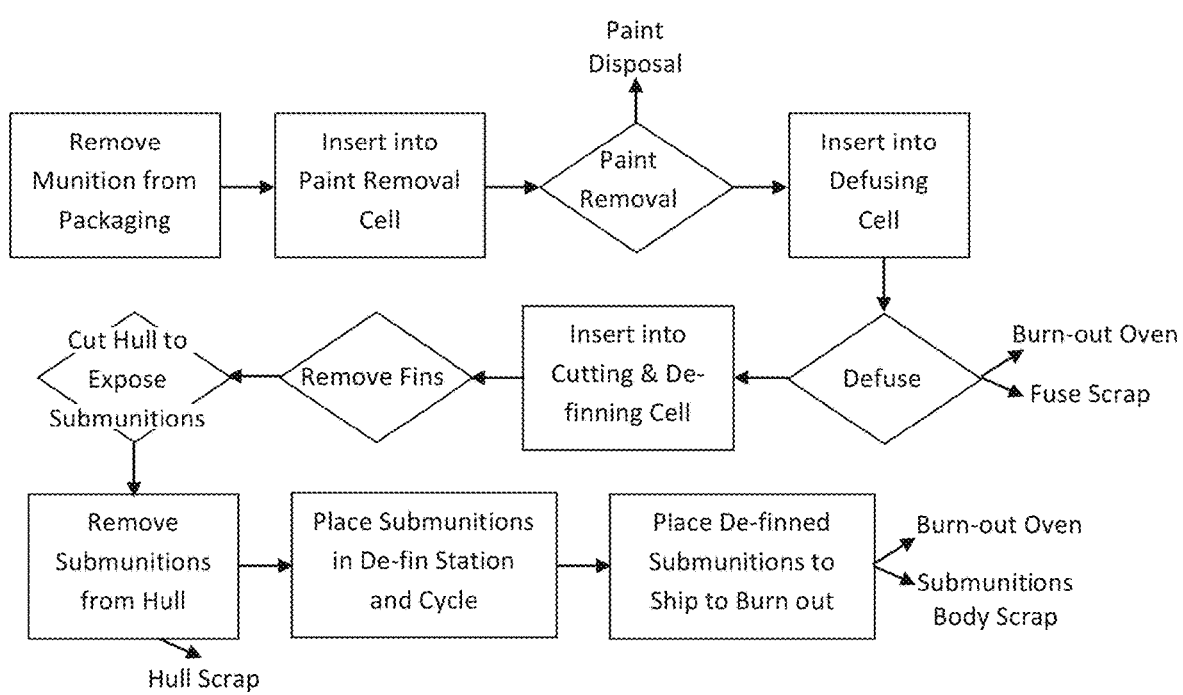
FIG. 3 shows a demil process flow.

Referring back to FIG. 1 and FIG. 3, the automated system and process described begins with removal of the munitions [4] from their shipment packaging (via a lift gantry [1]), and for rounds that are painted with toxic materials, paint or surface removal. The preferred removal process is through high pressure water jet spray [3], with the resulting paint/water slurry processed to collect toxic material for environmentally appropriate means and return of gray water into the water system. The preferred approach, munition is hung from winch and rotated [2] to provide jet access to all sides.

The munition [4] is then lifted [5] from it packaging into a processing fixture [7]. The processing fixture is composed of two parts, an upper [8] and a lower [9]. The lower [9] provides mobility so the munition and fixture can be readily moved between distinct processing stations. The upper holds [8] the munition in place on rollers (not shown for simplicity) so that it can be freely rotated about its axis to support cutting and removal of the tail section [12], and removal [11] of the fuse.

Before removal of the fuse, a computer vision algorithm determines that the munition is disarmed [10A]. If it is not the process is suspended, and bomb disposal personnel evaluate the munition and fuse to determine the best way to safely remove the fuse. Upon passing this inspection, the fuse cover (if any) is removed, and the fuse is pulled (either unscrewed or removed by undoing bolds/screws that hold it on the munition body). The fuse is then sent to burn-out and the residual metal disposed of as scrap. The tail section is sawed off by rotating the munition around its axis while in contact with a circular saw or by removing bolts/screws that hold the tail section in place. The tail is then disposed of as scrap metal.

After the tail and fuse are removed, the munition body is sawed into two pieces to expose any submunitions [13]. The opened body (in its transport cart), is moved to a robotic submuniton downloading station. At this station each submunition [15] is localized [10C], grasped, and picked-up by a robotic arm [14] and placed into the submunition de-finning station [16] (also shown in more detail in FIG. 4). After being picked up, but before insertion into the de-finning station, the submunition is inspected [10B] to determine if it is disarmed. If it is not the process is suspended, and bomb disposal personnel evaluate the submunition to determine the best way to safely demilitarize it.

Upon passing this inspection, the submunition is placed into the de-finning station to separate the metal submunition body [15] from its fins [26], which are collected and disposed of as scrap [27]. Another robotic arm [17] acquires the de-finned body from the de-finning station and stacks it into a pallet [18] for transshipment to the submunitions burn-out station.

Alternative processes for removing submunitions for downloading include pulling them through the opening that was made in either the nose or the tail after fuse and tail sections have been removed respectively. Removal may either be submunition-by-submunition, or as a group (all submunitions at a time from which a robotic pick and place like that previous described could be performed).

For plain High Energy (HE) munitions, the unitary or segment HE components can be removed by similar means to that described for submunitions removal, could be dissolved or melted and drained as a fluid, or the entire munition body sent to a burn-out facility rendering the body inert. These alternatives employ similar automation sequences as described for the most complex case of demilitarizing cluster munitions or bombs.

The invention claimed is:
1. A system for demilitarizing munitions, comprising:
a central controller configured to provide an operator interface that enables control of the system, including stop and start functions, while displaying real-time operational status, safety warnings, and flagged conditions requiring manual intervention;
a plurality of workcells operatively coupled to the central controller, each workcell being operative to receive ordnance for sequential
demilitarization processes, the plurality of workcells including at least the following:
(a) an inspection and paint removal cell operative to inspect the ordnance, and in response to determining that outer surface stripping is required strip paint or other coatings from the outer surface of the ordnance for disposal of the paint or other coatings;

(b) a defusing cell operative to detect the presence of a fuse and remove the fuse from the ordnance using a manipulator arm, the removed fuse being transferred for disposal;

(c) a cutting and definning cell operative to remove external fins from the body of the ordnance, and cut into the body of the ordnance to determine if submunitions are present in the ordnance; and (d) a submunition demilitarization cell including a multi-axis robot arm and computer vision system, the submunition demilitarization cell being configured to perform submunition demilitarization processes without manual intervention, including operations via the multi-axis robot arm and the computer vision system to autonomously identify and remove individual submunitions from the ordnance, inspect each submunitions using the computer vision system to determine an armed state, and transfer each of the submunitions, based on the inspection, either to the cutting and definning cell for further mechanical separation or to a burn-out or disposal station for safe disposal;

wherein the central controller is further configured to monitor each workcell and initiate system termination or intervention alerts when abnormal conditions are detected.

2. The system of claim 1, wherein the multi-axis robot arm and computer vision system is configured to examine a visual indicator on the ordnance to determine if the fuse is armed.

3. The system of claim 2, wherein the multi-axis robot arm is configured to remove the fuse if determined to be unarmed by the computer vision system.

4. The system of claim 1, wherein the workcells are configured to be coordinated and monitored by the central controller, and the central controller is configured to implement safety interlocks and checks to prevent personnel from entering a workcell cell when that workcell is operating.

5. The system of claim 4, wherein the central controller is also configured to flag the detection of an armed munition or submunitions and terminate the operation of the system pending manual analysis.

6. The system of claim 1, wherein the submunition demilitarizing cell is configured to transfer each submunition to the cutting and definning cell (c) for further demilitarizing processing.

7. The system of claim 1, wherein the submunitions are cluster munitions.

8. The system of claim 1, wherein the submunitions are array munitions.

9. A system for demilitarizing ordnance containing cluster or array submunitions, the system comprising:

a central controller configured to provide an operator interface that enables control of the system, including stop and start functions, while displaying real-time operational status, safety warnings, and flagged conditions requiring manual intervention;

a plurality of workcells operatively coupled to the central controller, each workcell being operative to receive ordnance for sequential demilitarization processes, the plurality of workcells including at least the following:

(a) a cutting cell operative to cut into the body of the ordnance to determine if cluster or array munitions are present in the ordnance; and (b) a submunition demilitarization cell including a multi-axis robot arm and computer vision system configured to perform submunition demilitarization processes without manual intervention, including operations via the multi-axis robot arm and the computer vision system to autonomously identify and remove individual submunitions from the cluster or array, inspect each submunition using the computer vision system to determine an armed state, and transfer each of the submunitions, based on the inspection, either to the cutting cell for further mechanical separation or to a burn-out or disposal station for safe disposal;

wherein the central controller is further configured to monitor each workcell and initiate system termination or intervention alerts when abnormal conditions are detected.

10. The system of claim 9, wherein the multi-axis robot arm and computer vision system are operative to examine a visual indicator on the ordnance to determine if the ordnance is armed.

11. The system of claim 9, wherein the multi-axis robot arm is operative to remove a fuse from the ordnance.

12. The system of claim 9, wherein the workcells are coordinated and monitored by the central controller, and the central controller implements safety interlocks and checks to prevent personnel from entering a workcell cell when that workcell is operating.

13. The system of claim 12, wherein the central controller also flags the detection of an armed munition or submunitions and terminates the operation of the system pending manual analysis.

14. The system of claim 1 wherein the central controller is further configured to integrate and process data from computer vision systems, lidar, and other sensors to localize ordnance, submunitions, and disarm indicators.

15. The system of claim 6 wherein each individual submunition is transferred to a burn-out station after being definned.

* * * * *